United States Patent
Krikorian et al.

(10) Patent No.: US 7,965,226 B2
(45) Date of Patent: Jun. 21, 2011

(54) AGILE BEAM PULSE TO PULSE INTERLEAVED RADAR MODES

(75) Inventors: Kapriel V. Krikorian, Calabasas, CA (US); Robert A. Rosen, Agoura Hills, CA (US); Mary Krikorian, Calabasas, CA (US)

(73) Assignee: Raytheon Company, Waltham, MA (US)

( * ) Notice: Subject to any disclaimer, the term of this patent is extended or adjusted under 35 U.S.C. 154(b) by 162 days.

(21) Appl. No.: 12/416,064

(22) Filed: Mar. 31, 2009

(65) Prior Publication Data

US 2010/0245162 A1  Sep. 30, 2010

(51) Int. Cl.
*G01S 13/00* (2006.01)
(52) U.S. Cl. .................. 342/131; 342/137; 342/202
(58) Field of Classification Search .................. 342/131, 342/137
See application file for complete search history.

(56) References Cited

U.S. PATENT DOCUMENTS

| | | | |
|---|---|---|---|
| 3,787,848 A * | 1/1974 | Laundry et al. | 342/162 |
| 4,057,800 A * | 11/1977 | Ganz | 342/116 |
| 4,143,373 A * | 3/1979 | Chernick | 342/88 |
| 4,593,286 A | 6/1986 | Mathews et al. | |
| 4,720,711 A | 1/1988 | Quesinberry et al. | |
| 4,733,238 A * | 3/1988 | Fiden | 342/60 |
| 4,954,830 A * | 9/1990 | Krikorian et al. | 342/137 |
| 4,975,706 A * | 12/1990 | Shrader | 342/160 |
| 5,128,683 A * | 7/1992 | Freedman et al. | 342/158 |
| 5,726,657 A * | 3/1998 | Pergande et al. | 342/202 |
| 5,966,091 A * | 10/1999 | Andersson | 342/60 |
| 6,650,274 B1 | 11/2003 | Krikorian et al. | |
| 6,714,157 B2 | 3/2004 | Wittenberg | |
| 7,423,577 B1 * | 9/2008 | McIntire et al. | 342/57 |
| 2009/0323782 A1 * | 12/2009 | Baker et al. | 375/219 |

OTHER PUBLICATIONS

Farina et al. "Multitarget Interleaved Tracking for Phased-Array Radar". IEE Proceedings—F Communications, Radar, and Signal Processing. vol. 127. Issue 4. Aug. 1980. pp. 312-318.*

* cited by examiner

*Primary Examiner* — Thomas H Tarcza
*Assistant Examiner* — Matthew M Barker
(74) *Attorney, Agent, or Firm* — Christie, Parker & Hale, LLP

(57) ABSTRACT

A system and method for concurrently operating a plurality of agile beam radar modes by pulse-to-pulse interleaving groups of the radar modes. Radar modes are grouped, each radar mode being allocated a certain amount of time for operation and a suitable pulse repetition frequency to improve or optimize the duty cycle of the antenna while concurrently operating the plurality of modes. Priorities may be assigned to groups or to individual radar modes within each group. In some embodiments, TDM communications are further interleaved within the radar modes to enhance the operation of the radar antenna.

12 Claims, 5 Drawing Sheets

AGILE BEAM PULSE TO PULSE INTERLEAVED RADAR MODES

BACKGROUND OF THE INVENTION

The present invention is generally directed to radar system timing and control, and more particularly, a radar system for concurrent operation of multiple radar functions.

Conventional radar systems frequently utilize waveforms consisting of a series of pulses. For example, a pulse radar system known to those skilled in the art might transmit a pulse train having a certain pulse repetition frequency (PRF) toward a target, receiving reflections of those pulses from the target as echoes between the transmitted pulses. Various radar systems known to those skilled in the art are used for moving target indication (MTI), synthetic aperture radar (SAR), target tracking, automatic target recognition (ATR), and dismount detection, to name but a few.

In various applications, depending on a number of variables such as the radar cross section (RCS), the velocity, the range, the shape, and other characteristics of the target, and even the weather conditions and the characteristics and amount of clutter, detection of the target can be optimized by controlling parameters such as the PRF, the duty cycle of the pulses, the wavelength λ of the radio signal, and the direction and shape of the beam.

Also known to those skilled in the art, electronic beam steering and beam forming are enabled with agile beam radars that utilize a single antenna capable of changing the direction and/or shape of the beam to scan across multiple directions, for example, by utilizing a phased array antenna.

In the field of data communications, time division multiplexing (TDM) is a process known to those skilled in the art in which two or more apparently simultaneous channels are derived from a given frequency spectrum, i.e., bit stream, by interleaving pulses representing bits from different channels.

It is known to those skilled in the art that radar systems are frequently used to perform multiple ones of these functions. The most common conventional radar systems capable of performing multiple functions perform those functions sequentially. Moreover, many conventional systems suffer from slow agile beam updates and slow receiver or exciter frequency switching. Further, conventional systems frequently lack programmable waveforms and timing control.

For example, in a system performing SAR imaging, it may take 40 seconds to obtain an image. If such a system is instructed to sequence through multiple functions, the resources are tied up for the entire 40 seconds before the next sequential function may begin. During this time, a missile could be launched, presenting a serious problem for a pilot.

A multi-functional agile beam pulse radar system that interleaves multiple radar signals to achieve essentially simultaneous operation of multiple functions has been disclosed in the patent issued to Wittenberg, U.S. Pat. No. 6,714,157. However, this document lacks a detailed discussion of the arrangement of particular modes or groups of modes for improving the operation and compatibility of the plural radar functions. Thus, there is a need in the art for an improved agile-beam system and method for concurrent operation of a plurality of radar modes.

SUMMARY

The present invention provides a system and method for concurrently operating a plurality of radar modes. In one aspect, the invention provides for grouping together the radar modes into at least one group. In one of the groups, each radar mode is allocated an amount of time for operation, and a pulse repetition frequency (PRF) for each mode is determined. Radar duty factors (i.e., pulse width, RF and bandwidth) are assigned for each mode as a function of the scenario and mode priority. Transmission and reception of pulses are scheduled for each mode, such that the radar modes are at least partially interleaved. The group of modes is then activated, such that the scheduled radar modes are executed. In some embodiments, determining the PRF for each radar mode includes selecting a minimum base PRF for each of the radar modes in the group, and assigning a mode PRF to each of the respective radar modes, the mode PRF corresponding to an integer multiple of the base PRF.

Another aspect of the invention provides for assigning a priority to each of the groups such that the groups are respectively activated in sequence of priority. In some embodiments, the grouping of radar modes is determined based on a compatibility of the radar modes with one another. The compatibility of radar modes is based on at least one of a mode priority, mode target swath range, a range of suitable PRFs for each mode, a burst-to-burst repetition rate, and a scan update rate.

Another aspect of the invention provides for the interleaving of time divisionally multiplexed data packets with the radar modes. These and other aspects of the invention enable, among other things, a reduction in imaging time in comparison to conventional techniques using sequential arrays, and are more fully comprehended upon review of this disclosure.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

In modern radar systems, particularly those for airborne platforms, the need for a large number of functions and a small hardware form factor have resulted in the desire for a system having a compact system capable of performing multiple concurrent functions in multiple directions. Thus, some embodiments of the present invention enable single-antenna systems to concurrently perform GMTI, A/A search while track, and communications, along with long duration modes such as high resolution SAR, dismount detection, ATR, and targeting functions. The robust waveforms disclosed herein enable increased surveillance, high track updates, and improved discrimination of targets.

Figure 1:
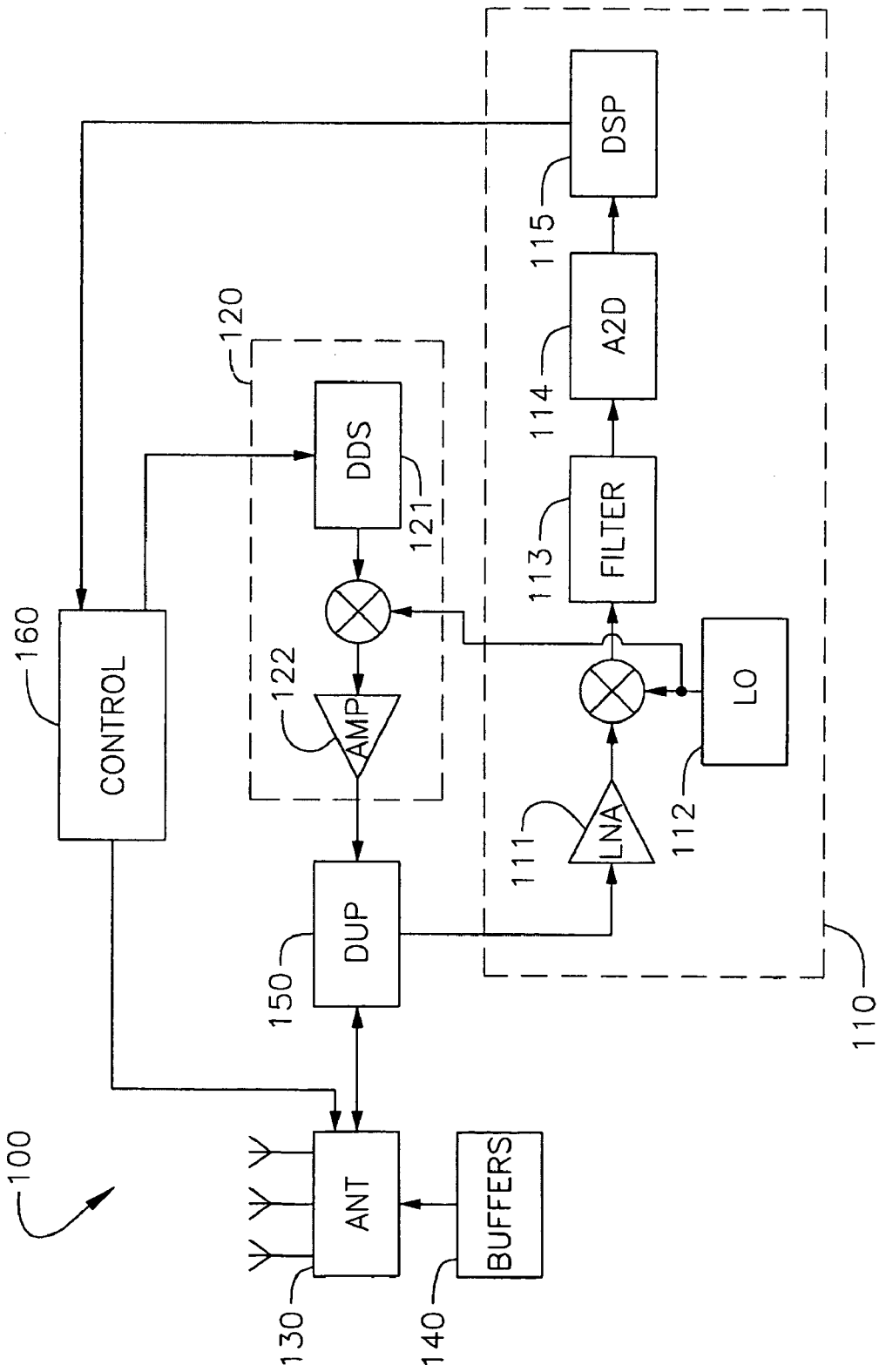
FIG. 1 is a block diagram illustrating a system according to an exemplary embodiment.

A radar system 100 according to an exemplary embodiment of the present invention is illustrated in FIG. 1. This block diagram is simplified for ease of description, and one skilled in the art will understand that not every element shown in the illustration is necessary to the invention, and various embodiments still within the scope of the invention will include additional elements and/or lack certain of the described elements. In this embodiment, a receiver 110 and a transmitter 120 are each adapted to very quickly coherently switch frequencies, that is, with a very small switching time. A duplexer 150 is utilized in this embodiment to enable the use of the same antenna 130 for both transmission and reception of the radar signal, while protecting the receiver 110 from damage from the high-power signal transmitted from the transmitter 120.

In various embodiments of the transmitter 120, a function generator, a dedicated circuit, or a direct digital synthesizer (DDS) may be utilized as an exciter to generate source frequencies. In the illustrated embodiment, the transmitter 120 includes a DDS 121 configured to generate arbitrary waveforms, coupled to an amplifier 122.

The receiver 110 includes a low-noise amplifier 111 for amplifying received signals, and mixes the amplified signal with a local oscillator 112. The mixed signal is filtered using a bandpass filter 113 to isolate the desired signal, which is then converted to a digital signal using the analog-to-digital converter 114 for further processing by a digital signal processor 115. In this embodiment, each part of the receiver 110 is configured to quickly adapt to properly receive signals in a number of different frequency bands.

An agile beam antenna, such as a phased array 130, is configured for rapid steering and forming of the transmitted beam. While some embodiments may utilize a mechanically steered directional antenna capable of agile beam operation, one skilled in the art will understand that a phased array 130 enables substantially faster steering and improved beam forming.

Certain embodiments that utilize a phased array agile beam antenna 130 include a series of phase shifters for steering and forming the beam. In order to improve the beam switching speed, some further embodiments utilize a series of buffers 140 or other form of memory coupled to the phase shifters to store the phase required to direct the beam to each of the desired positions. Thus, in embodiments of the present invention that alternate between two or more directions repeatedly, less resources are required, and time is saved by cycling through the buffers. In this way, it is not necessary to recompute the phase of the phase shifters in the phased array antenna for each change in the pulse.

The system 100 further includes a controller 160. The controller may be a powerful multitasking microprocessor configured to perform a large number of functions in addition to the control of the radar system 100, such as flight control and communications. In other embodiments, the controller 160 is a dedicated controller including an application specific integrated circuit, a microprocessor, or a programmable gate array. Thus, the algorithm described below may be performed by hardware or software, and the system is not limited to any particular form of controller.

The controller 160 functions to manage the system timing and to enable the concurrent operation of one or more functions in one or more directions. For example, in some embodiments, the same or similar function may be performed concurrently in a plurality of directions by time-dividing or interleaving the signals for the different directions. That is, a high resolution ground image with a fast update rate is achieved over a wide angle from the antenna by interleaving signals to concurrently illuminate smaller angles in multiple directions. In other embodiments, different functions, such as imaging and tracking, may be performed concurrently in either the same direction or in different directions. One skilled in the art will comprehend that the interleaving described herein may be for the same type of radar signals in multiple directions, and/or different types of radar signals in the same or in different directions, and TDM communications, in any of a wide array of combinations.

Moreover, some embodiments interleave their respective radar functions by suitably grouping together different radar modes, and interleaving those radar modes in time. For example, the highest performance waveforms may be selected for operation in concurrent modes. In some embodiments, functions having relatively high pulse repetition frequencies (PRFs) would be grouped together into one group, and functions having relatively low PRFs would be grouped together in another group. In other embodiments, functions having low PRFs are grouped together with functions having high PRFs, where the high PRFs are integer multiples of the low PRFs.

In some embodiments, when many functions are to be performed concurrently (e.g., search, A/A, multiple SAR maps, multiple tracks, and TDM communications), the functions are grouped together based on the compatibility of waveforms of the individual modes and function priorities. Waveform parameters for these interleaved modes are determined for each group so as to satisfy the individual radar modes' range-doppler ambiguity and resolution requirements.

That is, in an exemplary embodiment of the present invention, by utilizing the below-described optimization of the pulse waveforms, several waveforms having a wide range of PRF are pulse to pulse interleaved with other waveforms for long duration modes for agile beam concurrent operation along with TDM communications waveforms.

In further detail, embodiments of the invention utilize an algorithm to improve or optimize the interleaving of various functions or modes. In order to determine the waveforms, the algorithm utilizes several inputs, from a pilot or operator of the radar or from other sources, to determine the preferred pattern of interleaved waveforms based on those inputs.

The most basic inputs to the system include the selected radar functions or modes to be performed concurrently. The requirements for each selected radar mode are also parameters used by the system, and include such matters as the minimum and maximum range, the receive window size, the resolution of the image, the scene update and track update rate, the search coverage rate, and the search frame rate.

Further inputs include variables related to the geometry of the system itself, including the location, speed, and trajectory of the radar and those of the target. Parameters and constraints of the radar system may also be inputs that affect the algorithm, such as the beam width, the radar cross section (RCS) of the target(s) and/or the clutter, the range of pulse widths for the desired radar modes, their duty factors, the range of PRF for the selected functions that would allow acceptable ambiguities, the radar frequency and bandwidth, the beam switching time, the RF switching time, and the internal losses within the radar system hardware. A system according to various embodiments may not utilize each of these parameters or constraints in a particular implementation, and one skilled in the art will comprehend that based on the specifics of the particular embodiment, some of these parameters may be inputs while others may be calculated as outputs.

Finally, the algorithm depends on inputs including certain mission requirements, a selection of which modes are to be performed concurrently, and/or a prioritization of the modes based on their importance to the mission. In various embodiments, these inputs may be entered by an operator, such as a pilot, may be input by another individual, or may be input by the system.

Figure 2:
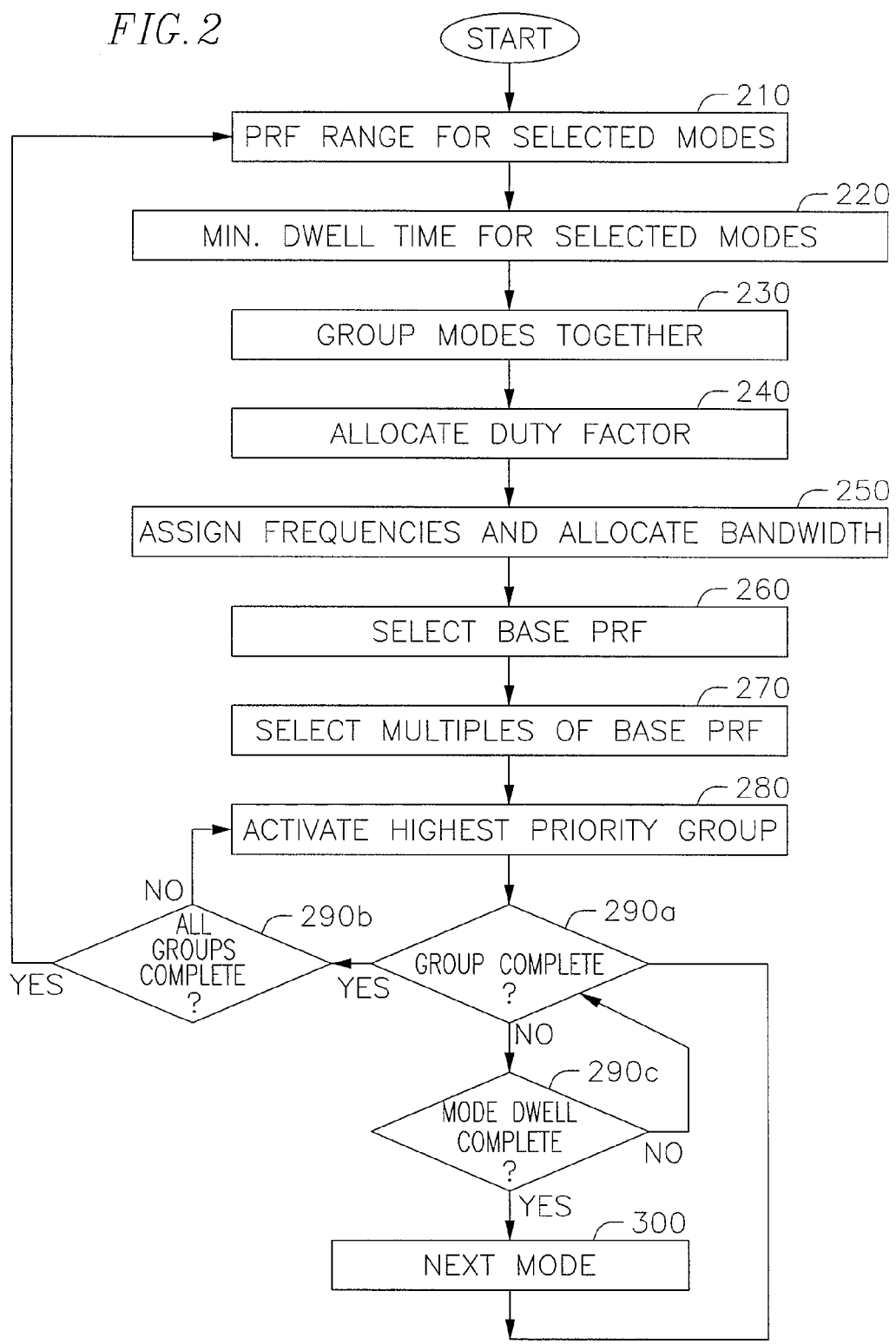
FIG. 2 is a flow chart illustrating a process according to an exemplary embodiment.

Taking the inputs to the system, the exemplary embodiment then executes a process as illustrated in the flow chart of FIG. 2. In this exemplary process, the waveforms for each of the radar modes are scheduled and executed in such a way that each mode is concurrently operated and results in an acceptable ambiguity, resolution, and update speed. The system suitably controls the transmission power for each particular function and/or direction, as well as the average power of the overall transmission. Each waveform is suitably allocated a duty factor and a pulse repetition frequency (PRF) as follows.

In block 210, the process determines the range of PRFs for the selected radar modes. The range of PRFs is determined to result in acceptable radar range and doppler ambiguities for each selected mode. In block 220, the process determines the required minimum dwell time for each selected mode. The dwell time is the time required to remain in a particular mode in order to generate the desired output.

In block 230, the process groups together the selected radar modes for concurrent operation as a function of mode priority, waveform compatibility, and the required scan update rate. Waveform compatibility includes factors such as similarity of ranges of suitable PRFs and burst-to-burst repetition rate. Depending on the number of modes and compatibility among those modes, more than one group may be necessary. In block 240, the process allocates the radar duty factor for each concurrent mode within each group. One skilled in the art will comprehend that the duty factor will depend on variables such as the dwell time for each mode, the range of the target to be scanned with those modes, among other factors.

In block 250, the process assigns frequencies and allocates the available bandwidth for each concurrent radar mode within each group as a function of the radar mode priority and the required range resolution.

In block 260, the process selects the minimum acceptable common base PRF for the concurrent modes within each group. In block 270, the process selects integer multiples of this base PRF as needed for certain concurrent radar modes within a group if higher PRFs are required by these radar modes. That is, while some modes will have a PRF equal to the base PRF (wherein the integer multiple is 1), other modes will have a higher PRF (wherein the integer multiple is 2 or higher). Of course, the higher PRFs should still fall within the range of PRFs selected in block 210. In this way, concurrent radar modes within a particular group are aligned such that they do not overlap even when they have different PRFs.

Beginning with block 280, the process begins the execution of the concurrent radar modes and groups. The process steps 210-270 result in a queue of at least one group of concurrent radar modes, with each group being assigned a group priority.

In block 280, the process activates the highest priority group waiting in queue. As discussed in more detail below, this entails cycling through the concurrent radar modes within the active group one at a time in turn, with each radar mode being active for its allocated dwell time.

In block 290a, the process determines whether all the required concurrent radar modes within the active group are complete. If all the radar modes in that group are complete, the process determines in block 290b whether all of the groups have been activated. If there are still groups to be activated, the process returns to block 280, and activates the next highest priority group waiting in queue. If all the groups have been activated, the process returns to the beginning, or block 210, to set up the next group or groups of radar modes.

If the process in block 290a determines that all the required concurrent radar modes within the active group have not been completed, then in block 290c the process determines whether there is time left in the dwell of the active mode. If the dwell of the active radar mode is incomplete, the process returns to block 290a to once again determine whether the active group is complete. If, however, the process determines in block 290c that the dwell of the active radar mode is complete, the process in block 300 replaces the completed interleaved mode with a different radar mode within the active group, and returns again to block 290a to check if the group is complete.

Figure 3:
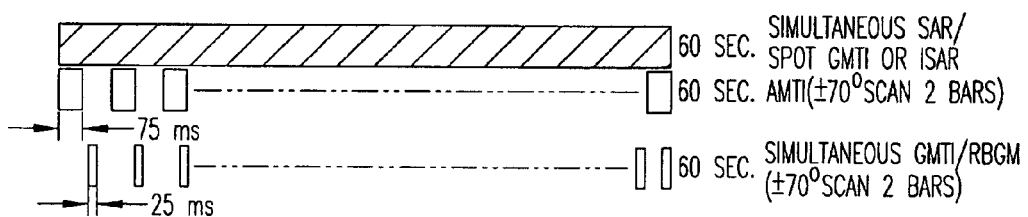
FIGS. 3-4 are timing diagrams illustrating the interleaving of three radar modes including a pulse burst mode according to an exemplary embodiment.

FIG. 3 is a timing diagram illustrating the interleaving several radar modes for concurrent operation according to an exemplary embodiment of the invention. In this embodiment, synthetic aperture radar (SAR) imaging, airborne moving target indication (AMTI), and ground moving target indication (GMTI) are concurrently operated by interleaving their signals.

Air to air (A/A) functions such as AMTI typically use periodic bursts having a certain burst-to-burst repetition rate, each burst having a relatively high PRF, while some air to ground (A/G) functions such as GMTI typically use a relatively low PRF. In the exemplary embodiment, pulse burst waveforms for the A/A functions can be effectively interleaved with low PRF waveforms for the A/G functions.

As illustrated by the shaded bar in FIG. 3, the process of obtaining a ground map with the SAR is performed over a relatively long period of time, i.e., 60 seconds. However, rather than necessitating a delay until the SAR map is complete, the other functions are concurrently performed by interleaving their pulses.

Figure 4:
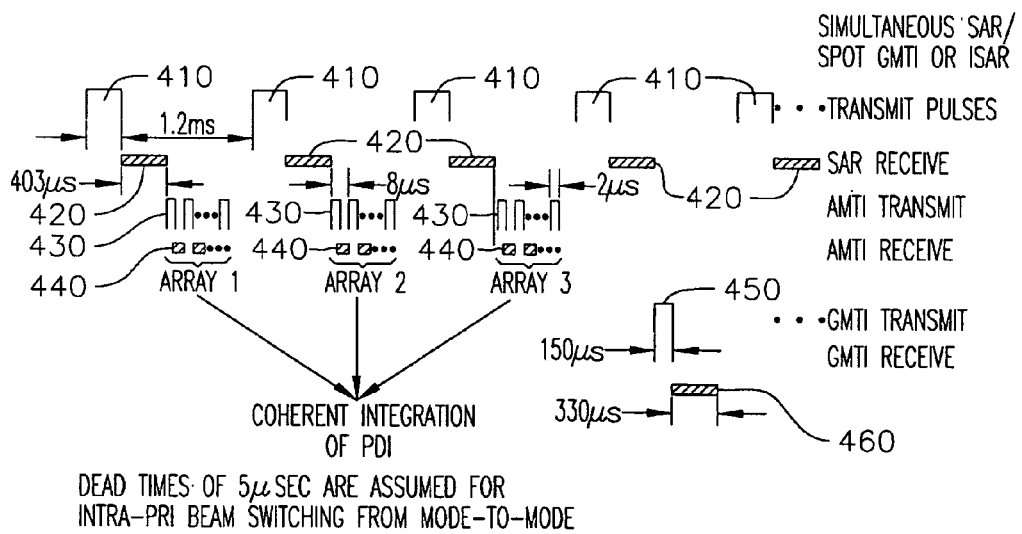

FIG. 4 illustrates the interleaving of the three functions using a smaller time scale to show more detail.

In FIG. 4, periodic transmit pulses 410 and receive pulses 420 for the SAR imaging are repeated with a period of 1.6 ms. That is, a transmit pulse (or series of pulses) 410 is transmitted over a period of 400 μs, and its echoes are received as receive pulses 420 during the following 400 μs, followed by a "gap" of 800 μs. This process is then repeated over many iterations during the next 60 seconds. During the "gap", the other functions are interleaved with the SAR signals. In this embodiment, a burst of high-PRF AMTI signals are sent with transmit pulses 430 and received with receive pulses 440 during some of the gaps, and low-PRF GMTI signals are sent with transmit pulses 450 and received with receive pulses 460 during other gaps. In this way, high-PRF modes are successfully interleaved with low-PRF modes while concurrently performing a long-duration SAR image.

Figure 5:
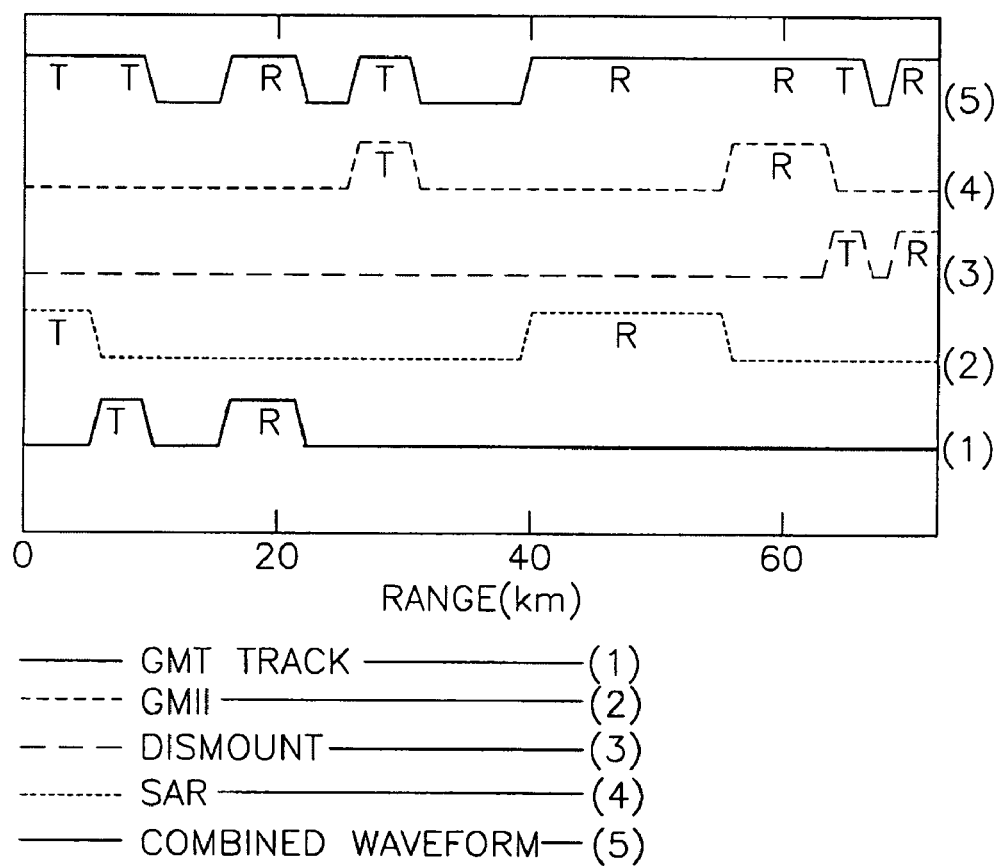
FIGS. 5-6 are timing diagrams illustrating the interleaving of several radar modes according to another exemplary embodiment.
Figure 6:
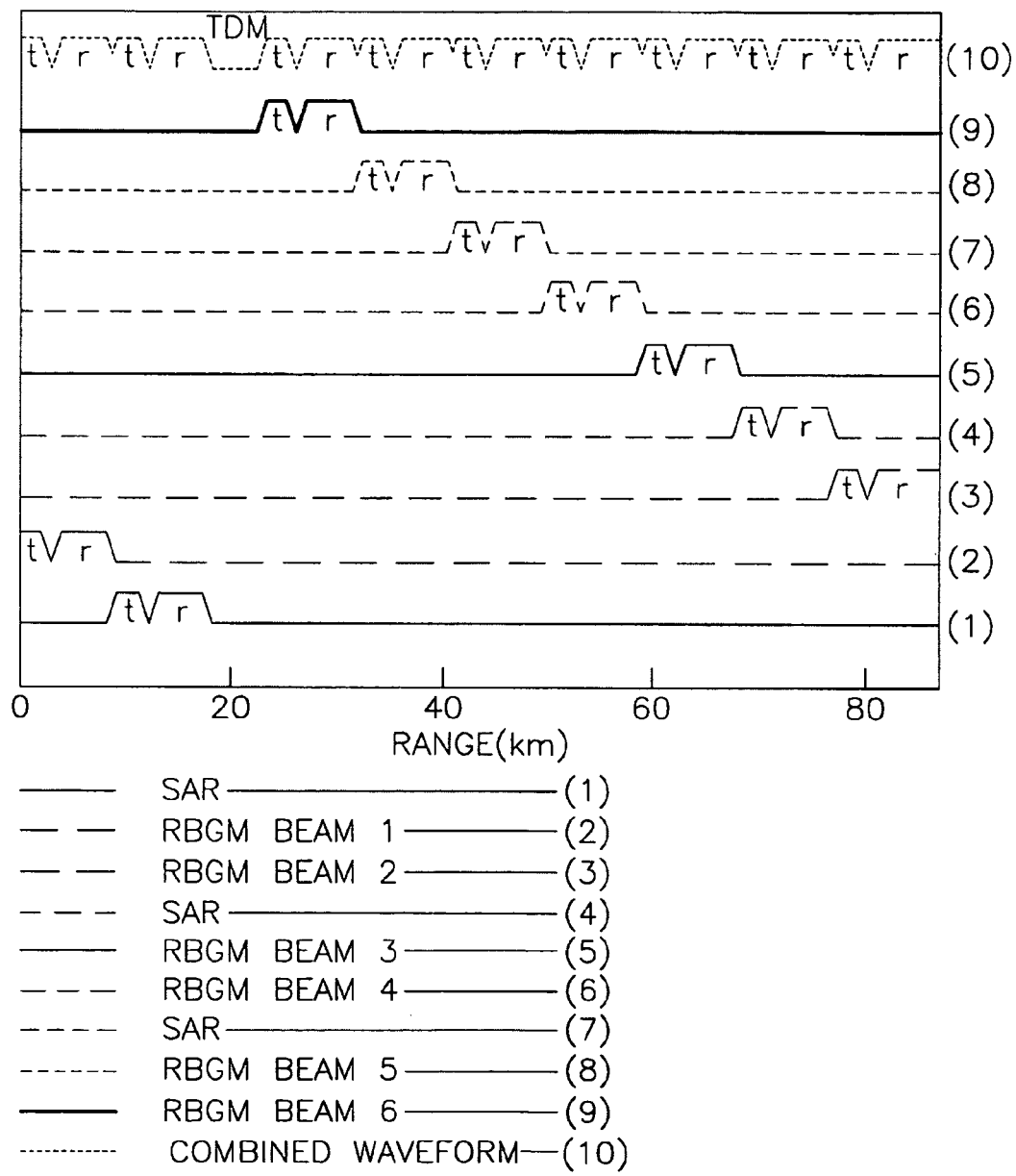

FIGS. 5-6 are timing diagrams illustrating waveforms resulting from two sets of inputs, according to an exemplary embodiment of the present invention. In FIG. 5, four radar modes are concurrently executed in a single group. That is, the concurrently executed modes include a SAR (1), a dismount detector (2) (wherein a dismount is a term for a walking human dismounted from a vehicle), GMTI (3), and GMT track (4). The combined waveform (5) is shown at the top. The illustration shows one full sequence, wherein the full sequence is repeated many times, or at least as long as it takes the embodiment to achieve the image from the longest duration mode, which here is the SAR.

In each waveform, the period during which the system is transmitting is illustrated with a T, and the period during which the system is receiving is illustrated with an R. As can be seen with the combined waveform (5), the system is required to rapidly switch back and forth between many different radar modes, and thus achieves a high duty cycle with relatively little down-time.

FIG. 6 shows another example in which the exemplary embodiment interleaves nine radar modes for concurrent operation, and further interleaves TDM communications. Unlike the embodiment illustrated in FIG. 5, the embodiment illustrated in FIG. 6 remains in a particular radar mode after transmitting radar pulses, until it receives reflected pulses for that mode before switching to the next mode. As is evident from FIG. 6, a very large duty cycle can be achieved by interleaving many radar modes for concurrent operation using embodiments of the present invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for concurrently operating a plurality of pulsed radar modes, comprising:
    grouping the radar modes into at least one group as a function of mode priority and waveform compatibility, the at least one group comprising a first group;
    allocating an available bandwidth to each radar mode within the first group;
    determining a pulse repetition frequency (PRF) for each radar mode within the first group;
    scheduling the transmission and reception of pulses for each radar mode within the first group such that the radar modes are at least partially interleaved; and
    activating the first group to execute the scheduled radar modes within the first group.

2. A method for concurrently operating a plurality of pulsed radar modes, comprising:
    grouping the radar modes into at least one group, the at least one group comprising a first group;
    allocating time to each radar mode within the first group;
    determining a pulse repetition frequency (PRF) for each radar mode within the first group;
    scheduling the transmission and reception of pulses for each radar mode within the first group such that the radar modes are at least partially interleaved; and
    activating the first group to execute the scheduled radar modes within the first group, wherein determining a PRF for each radar mode comprises:
    selecting a minimum base PRF for each of the radar modes within the at least one group; and
    assigning a mode PRF to each of the respective radar modes, the mode PRF corresponding to an integer multiple of the base PRF.

3. The method of claim 1, wherein the at least one group comprises a plurality of groups, each group of the plurality of groups having a priority such that the groups are respectively activated in sequence of priority.

4. The method of claim 1, wherein grouping the radar modes into at least one group comprises:
    determining a compatibility of the radar modes based on at least one of a mode priority, a range of suitable PRFs for each mode, a burst-to-burst repetition rate, and a scan update rate; and
    separating the radar modes into groups based on the compatibility.

5. The method of claim 1, further comprising interleaving time divisionally multiplexed data packets with the radar modes in the first group.

6. The method of claim 1, further comprising:
    selecting the plurality of radar modes for concurrent operation from a predetermined list of available radar modes; and
    selecting one or more parameters for each selected radar mode, the parameters comprising one selected from the group consisting of radar platform location, radar platform velocity, target location, target range, target minimum range, target maximum range, update rate, and mode priority.

7. A system for concurrent operation of a plurality of radar modes, comprising:
    an agile beam antenna for transmitting and receiving radar signals;
    a transmitter for generating radar signals for driving the antenna;
    a receiver for receiving and processing signals received by the antenna; and
    a controller coupled to the antenna, the transmitter, and the receiver, for managing timing and operation of the antenna, the transmitter, and the receiver,
    wherein the controller is configured to interleave transmission and reception of a plurality of radar modes through the antenna, the radar modes being grouped into at least one group according to a compatibility of the radar modes based on at least one of a mode priority, a range of suitable PRFs for each mode, a burst-to-burst repetition rate, and a scan update rate.

8. The system of claim 7, wherein the controller is further configured to select a minimum base PRF for each of the radar modes within the at least one group, and assign a mode PRF to each of the respective radar modes, the mode PRF corresponding to an integer multiple of the base PRF.

9. The system of claim 7, wherein the controller is further configured to determine a compatibility of the radar modes based on at least one of a mode priority, a range of suitable PRFs for each mode, a burst-to-burst repetition rate, and a scan update rate; and separate the radar modes into groups based on the compatibility.

10. The system of claim 7, wherein the controller is further configured to select the plurality of radar modes for concurrent operation from a predetermined list of available radar modes; and select one or more parameters for each selected radar mode, the parameters comprising one selected from the group consisting of radar platform location, radar platform velocity, target location, target range, target minimum range, target maximum range, update rate, and mode priority.

11. The system of claim 7, wherein the at least one group comprises a plurality of groups, each group of the plurality of groups having a priority such that the groups are respectively activated in sequence of priority.

12. A method for concurrently operating a plurality of pulsed radar modes, comprising:
    determining a range of pulse repetition frequencies (PRFs) for selected radar modes;
    grouping the selected radar modes into a plurality of groups as a function of mode priority and waveform compatibility;
    allocating a radar duty factor to each radar mode within each of the plurality of groups;
    selecting a minimum acceptable common base PRF for the selected modes within each group, the minimum acceptable common base PRF being within the determined range of PRFs;
    determining a pulse repetition frequency (PRF) for each radar mode within each group; and
    interleaving transmission and reception of pulses for each radar mode within said each group.

* * * * *